Feb. 11, 1930.   H. HECHT ET AL   1,746,424
ARRANGEMENT FOR DETERMINING THE DIRECTION OF SOUND
Filed Nov. 20, 1923   5 Sheets-Sheet 2

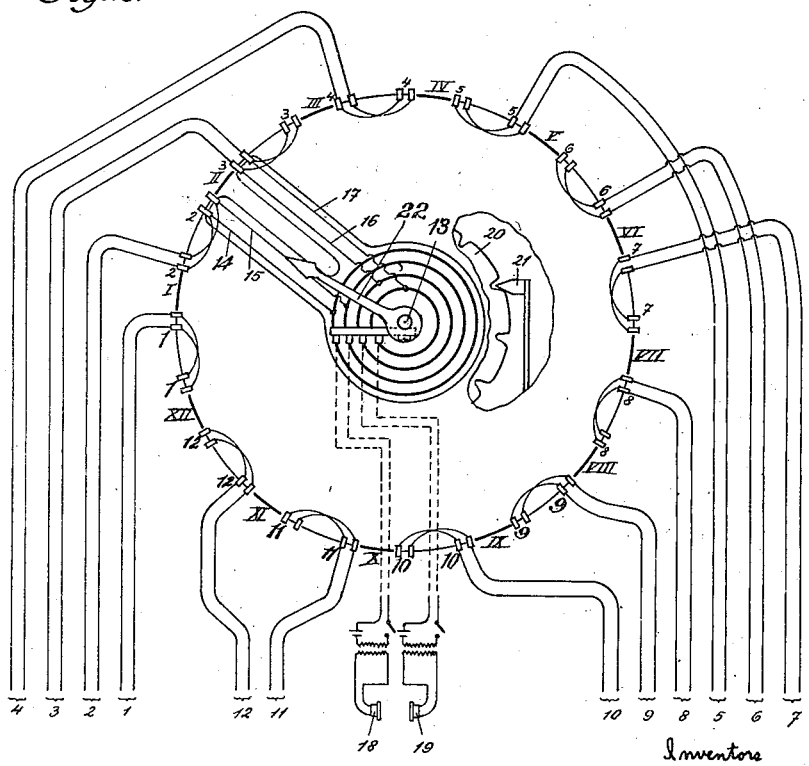

Inventors
Heinrich Hecht,
Hugo Lichte, and
Friedrich Wolf
by Knight Bro.
attorneys

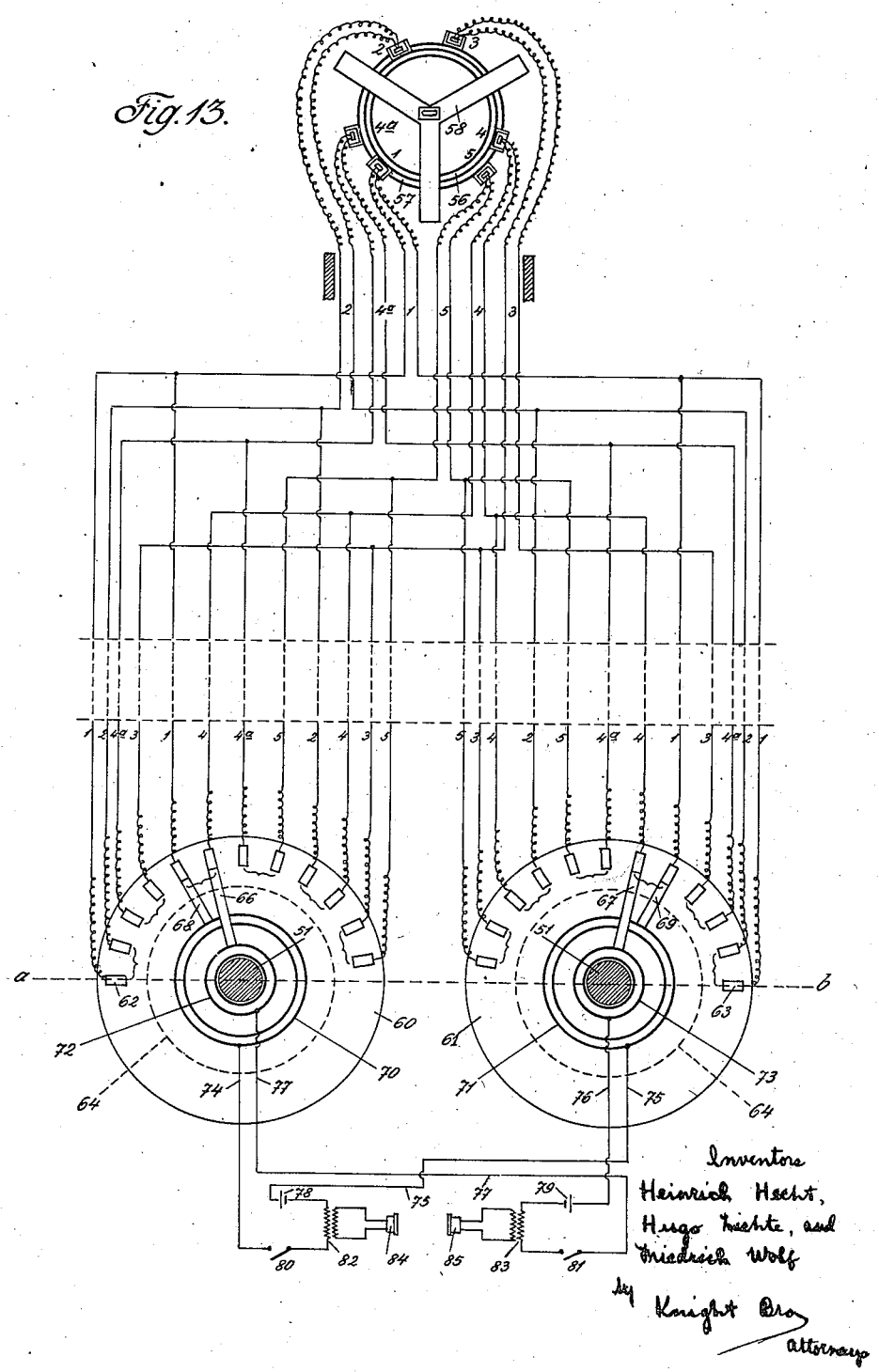

Patented Feb. 11, 1930

1,746,424

UNITED STATES PATENT OFFICE

HEINRICH HECHT, HUGO LICHTE, AND FRIEDRICH WOLF, OF KIEL, GERMANY, ASSIGNORS TO SIGNAL GESELLSCHAFT MIT BESCHRÄNKTER HAFTUNG, A FIRM LOCATED IN KIEL, GERMANY

ARRANGEMENT FOR DETERMINING THE DIRECTION OF SOUND

Application filed November 20, 1923, Serial No. 675,934, and in Germany December 4, 1922.

The invention concerns the problem of the univocal determination of the direction of sound-waves by means of the binaural basis-method. In order to solve this problem it has been proposed to employ two crossed measuring-bases and to compare the length of the sound-paths from the sound-source over both receivers of each basis with one another and thus to attain the correct angle of the direction. The comparison took place either by comparison of the free sound-paths, i. e. by turning the basis or by compensating the existing difference in the free sound-paths by means of devices for lengthening or shortening the sound-paths. The first method stipulates the use of turnable bases in the medium, but meets with constructive difficulties. The second method requires sound-tubes-leads adjustable in their length or devices for altering the constant of time of electric leads which, however, give rise to difficulties due to interference or resonance phenomena which appear.

These disadvantages are avoided by the device according to the invention. The principle of the invention is that a ring of measuring bases is formed in the medium to which, at the point of observation, a switching device suitably calibrated in degrees which can be switched on at will, corresponds. The measuring bases need not literally form a ring, but they should be so arranged that in continual succession the medium can be sounded step by step in sectors. These bases may be arranged in semi-circular order and doubly employed to enable the medium to be sounded in sectors extending over an entire circle. Alternative arrangements of these bases may be made to form certain figures such as the variously shaped polygons hereinafter referred to and shown on the drawings. The purpose of these alternative arrangements, resides in the essential saving in the space occupied. For example, the arrangement shown in Figures 8, 10, and 12 of the drawings, is peculiarly well adapted for economizing space. Other arrangements also such as those shown in Figures 6 and 9 contemplate to a considerable degree the saving of space.

The invention will be most easily comprehensible on examining the figures of the drawing which show:

Figure 1 is a diagrammatic plan view of a multiple base system for determining the direction of sound according to the present invention, said system being shown in an adaptation to a vessel.

Figure 2 is a wiring diagram embodying the fundamental principle of our invention.

Figure 13 is a diagrammatic plan view and wiring diagram of another embodiment of the receiving system.

Figure 3:
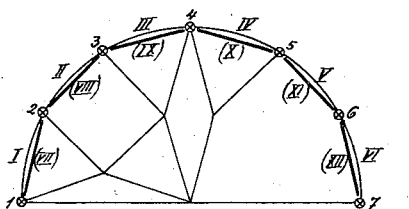
Figure 3 is a diagrammatic plan view of a semi-circular arrangement of bases according to which the medium may be sounded step by step in sectors covering a complete circle.

The Arabic numbers in Fig. 1 denote the sound-receivers firmly arranged on a vessel or otherwise on the ground or at the bottom of the sea. The roman numbers denote the bases formed by two receivers. Separate double-conductor-wires lead from the receivers to a switching-device as shown in principle in Fig. 2. This switch has contact-pieces arranged on a circle of which two together are connected to each receiver of the basis-circle as shown by the Arabic numbers on the contact. About the middle point 13 of the switch is a turnable contact-bridge with fixed leads 14, 15 and 16, 17. The ends of these leads end on the one hand in sliding contacts which according to their position correspond with the contacts-pairs 1, 2, 2, 3 etc. and come in contact with these pairs according to how the contact-arm is turned round the centre. On the other hand the leads 14 to 17 are connected to the battery-circuit for the microphones of the bases with which the telephones 18, 19 are connected by means of a transformer. A catch-device 20, 21 serves to indicate through the sense of feeling during the rotation that the contact-arm is set on the contacts of a basis. Another fundamental element of the device is a hand or indicator 22 which can be turned round the same axis 13 as the contact-arm, but independently of the latter. During each observation, the hand or indicator 22 may be adjusted to indicate the direction from which the observer appears to hear the sound, the indications thus obtained from two adjacent bases enabling the true direction to be determined.

The device is worked as follows:

It is supposed that the sound arrives in the direction of the arrow in Fig. 1. The observer then turns the contact-arm until the sound which, for example, at the commencement of the rotation appeared to come from the left, arrives from the right. This transition would, under the present supposition, take place when switching from the basis I to basis II. Now the observer only works with these two bases, i. e. by switching backwards and forward between them he finds out by switching on basis I under which angle the sound appears to come from the right and under which angle it appears to come from the left when switching on basis II. It is empirically possible by combining both angles to set down the exact angle of direction, if the observer turns the adjustable hand 22, while switching, according to his sense of feeling in the direction from which he believes to hear the sound.

It must be mentioned that, while rotating the contact-arm over the whole circle, there are two positions at which the sound-impression changes over from a position at the right of the center to one at the left of the center. These are, on the one hand, the position named on bases I and II and, on the other hand, the position on bases VII and VIII. The observer definitely places the source by these observations as approaching normal to a base between the two bases on which the observations were made and is able to judge quite accurately this position as an interpolation between the two observations. The sound-ray, therefore, must move in the opposite direction of the contact-arm, when he has set the correct side. That is the case when employing bases I and II in the assumed example, as, when he turns the contact-arm in the direction of the arrow in Fig. 1, he has a right impression at basis I and a left one at basis II. Therefore the sound has moved in a counter clockwise direction during the clockwise movement of the contact-arm. If he turns still further to the bases VII and VIII a transition of the sound-ray over the means impression also takes place there, but in the same direction as the hand-rotation.

It would be waste of space and furthermore hardly possible in practical life to employ such a circle of bases in reality, especially if the receivers are fitted in water or on board of a vessel. It would be more advantageous to use each basis in two directions. Half the number would suffice, as those bases which lie opposite one another at the end-points of a diameter, under the supposition that an even number of bases are provided, are parallel to one another and interchangeable. By this a basis arrangement as shown in Fig. 3 would result.

Figure 7:
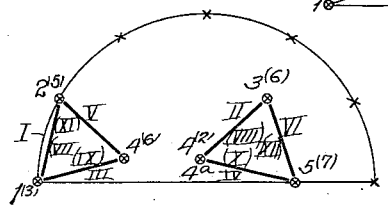
Figure 7 is a similar plan diagram showing a modification of the arrangement shown in Figure 6 with the bases arranged in separate triangles.
Figure 4:
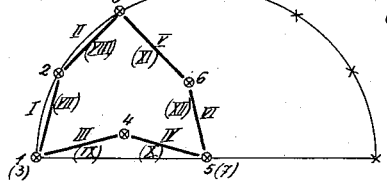
Figure 4 is a similar diagram of a modification according to which a complete circle of sounding sectors may be secured by the double use of bases arranged in the form of a six-sided polygon.
Figures 5, 6, 9:
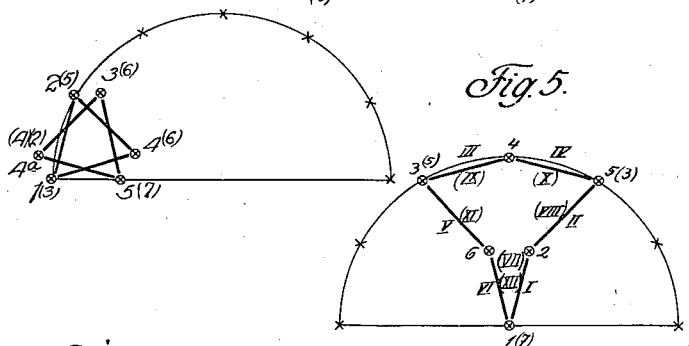
Figure 5 is a diagrammatic plan of another arrangement of a similar number of bases in a polygon of different form.
Figure 6 is a similar plan view of another modification according to which the bases are arranged for double use around the sides of two triangles having one apex in common.
Figure 9 is a plan diagram of another modification showing a variation in the triangular arrangement of sector-sounding bases.

As to the saving of space we can go a step further, namely, as can be derived from the squares and triangles in the semi-circle of Fig. 3, the receivers can be arranged as shown in Fig. 4 or Fig. 5. The arrangement of Fig. 6 results from the arrangement of Fig. 4. As in this case, the receivers 2, 3, 4 and 6 form the corners of a square, the receiver 4 can also undertake the function of receiver 3. This arrangement of Fig. 6 is remarkable in one point, as it permits, when employing 12 measuring bases (each of the six-angular bases is used twice), that the least possible number of 5 receivers suffice, whilst in the arrangements of Figs. 4, 5, 7 and 8 six receivers are necessary. A similar saving is also possible in Fig. 5, namely, that of Fig. 9 which also only shows 5 receivers. Although the arrangements of Figs. 6 and 9 have this advantage, they have also that disadvantage that a single receiver, namely, the one from which 4 bases proceed, destroys the possibility of use of all 4 bases proceeding from it, if by any eventuality it becomes defective. It is therefore practically more advantageous to choose the arrangements of bases according to Figs. 7 and 8, by which the break-down of one receiver can also put 2 bases out of working order, but never two which are used consecutively when measuring, so that a limited possibility of use of the installation still remains after a receiver is cut-out, with that restriction, however, that where a receiver is cut out the space from one basis to the next is a double angle, i. e. the exactitude at this place is half as great.

It must still be remarked to the arrangement of the bases of Fig. 8 that the receivers of the bases approach one another relatively and it is more advantageous on account of occurring influences of receivers lying close to another not to arrange the bases-triangles in the same plane, but above one another, as shown later in a practical example in Fig. 12.

The angle of inclination of consecutive bases to one another is given by the number $\frac{360}{n}$ degrees, where $n$ denotes the number of bases.

The number of double contacts required in a switching-device cannot generally be reduced correspondingly to the number of receivers. It always amounts to $2n$, where $n$ again is the number of bases employed. Naturally each basis here counts as often as it is really used, in Figs. 2–9 therefore double. These conditions are drawn in Fig. 10, in which a basis-formation on a vessel composed of triangles arranged above one another is represented. The receivers, the double leads and the contact pieces have corresponding Arabic numbers. The contact-circle is furthermore drawn with the degree-numbers 0–360. In this arrangement there are also three independently adjustable hands 22, 23 and 24 provided. The hand 23 serves for setting the direction perceived, on the one basis, hand 24 for setting the direction perceievd on the next basis and hand 22 for setting the mean direction. The connection of the microphone circle with the contact-bridges 15—18 is also not fastened in this arrangement as circular contact-pieces 25—28 are provided on which slide-contacts 29—32 slide.

Figure 10:
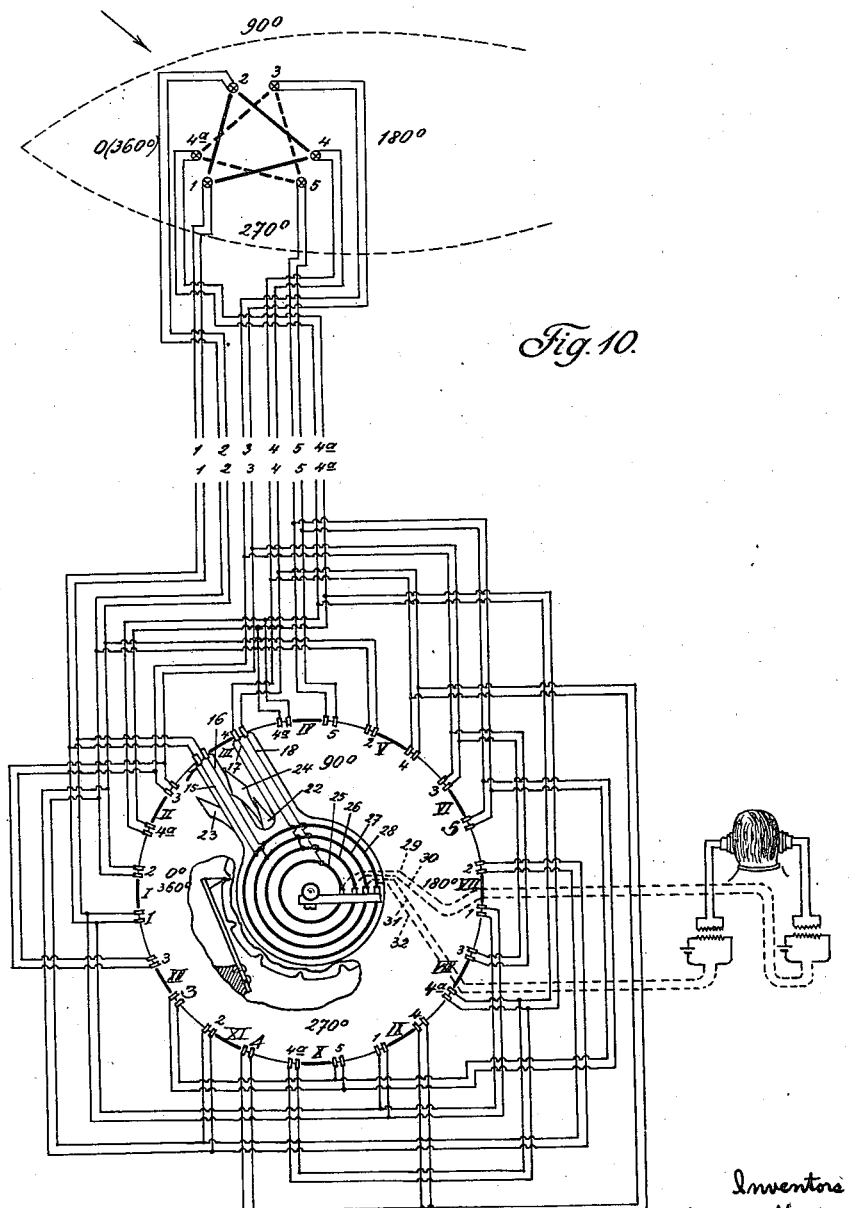
Figure 10 is a diagrammatic plan view and wiring diagram of a complete receiving system according to the arrangement of bases shown diagrammatically in Figure 8.
Figure 11:
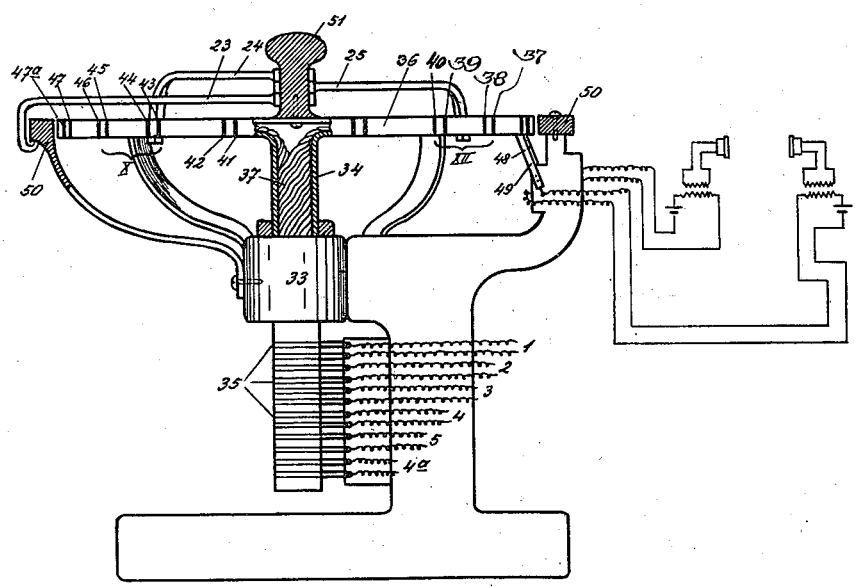
Figure 11 is a side elevation, partly broken away and partly shown in section, of a modified form of the rotary switch shown diagrammatically in Figures 2 and 10, and a wiring diagram related thereto.

Fig. 11 shows an example of a switching device for an arrangement according to Fig. 10. It is composed of a vertical turnable hollow shaft in a bearing 33 having a slide-contact 35 at lower end and a disk 36 at upper end. The numbers of the slide-contact-bridges 1—5 correspond to the numbers of order of the leads proceeding from the receivers 1—5 of Fig. 10. The slide-rings 35 are connected by means of leads 37 laid in the hollow shaft with contact pieces 37—47 fitted to the circumference of the disk 36. These contact-pieces correspond to a part of the double contacts on the circumference of disk having the numbers of order of the receivers of Fig. 10. The receiver-current is taken from the double-contacts by means of the contact-bridges 48, 49 and two contact-bridges for the other telephone which are not drawn. A ring 50 on which the three hands 23, 24 and 25 slide, is firmly bedded concentrically to the disk, these are loosely fitted to the shaft 34 projecting beyond the disk. A button 51 serves for turning the disk.

In this arrangement the contact-bridge is not turned, but the disks with the basis-contacts. The reason is to bring the basis-pair with which the measurement is really carried out, in front of the observer, so that he can correctly estimate the right- and left-angle corresponding to the position he occupies in respect to the measuring-apparatus. When using an apparatus in which the contact-disk is fastened and the contact-bridge turns, he would be obliged to estimate right- and left-angles at different positions of his contact-bridge and this would, as has been experienced, easily lead to incorrect estimates.

Figure 14:
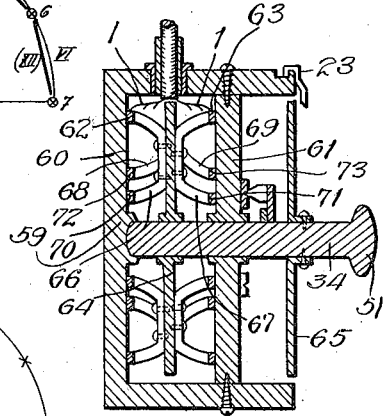
Figure 14 is an axial section of a rotary switch adapted to be used in a practical embodiment of our invention.
Figure 8:
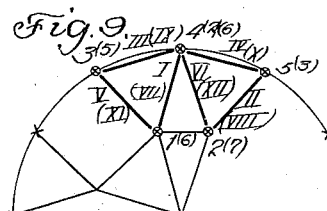
Figure 8 is a diagram in plan showing a modification in the arrangement of bases in triangles of which one is superposed above the other.
Figure 12:
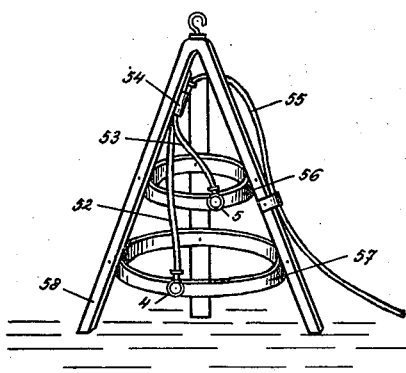
Figure 12 is a perspective view of a structural embodiment of receiver bases and supporting tripod therefor corresponding to the diagrammatic showing in Figures 8 and 10.

Fig. 12 shows a combination of two basis-triangles according to Fig. 8 attached to a tripod erected at the bottom of the sea. Two receivers 4 and 5 with the cables 52, 53 appertaining to them, the junction-box 54 and the main cable 55 are drawn. The receivers are attached to rings 56, 57 which are again fastened to the legs of the tripod 58 and lie in superposed horizontal planes. The upper part of Fig. 13 shows the same arrangement (top view) with schematic drawing of double leads from the receivers to the switch. The switch is somewhat different construction, as shown in section in Fig. 14. To the upper and lower walls 60 and 61 of a shell 59 contact-pieces 62, 63, etc. are attached in a circle, of which those lying vertically above one another belong together in pairs and are each connected with the double leads for example 1, 1 of the same receiver. These contact-pairs lying next to one another again form in pairs a basis. A turnable shaft 34 with a turning-button 51 passes through the middle of the shell, having a disk 64 inside the shell and outside a disk 65. This inner disk has 4 contact-bridges 66, 67 and 68, 69 of which two 66, 67 belonging together are longer and the two others are shorter and of which each pair slide on two congruent and concentric slide-rings 70, 71 and 72, 73. A listening device with telephone is connected to each of these slide-rings, namely always to the two of the same size on each of the two firmly arranged horizontal walls.

The lower part of Fig. 13 shows the disks 60, 61 opened up, the contact-pairs and the slide-rings being visible. A contact-pair 62, 63 connected to the receiver 1 in Fig. 13 is only provided with corresponding numbers.

Figure 15:
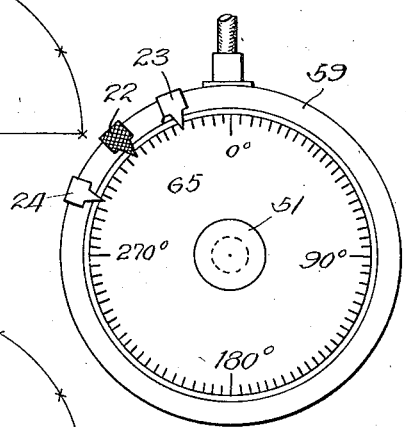
Figure 15 is a plan view of the same.

The other connections are carried out according to their use. The leads 74, 75 and 76, 77 leading to the batteries 78, 79, the switches 80, 81, the transformers 82, 83 and the telephones 84, 85 are shown here. The hands 22, 23, 24 are here replaced, as shown in Fig. 15, by riders 22—24 which are adjustable on the circumference of the shell 59 and serve for setting the correct angle of direction in the same manner as described for the hands. Fig. 15 shows the switching device covered in at top by a disk 65. This disk is gauged from 0–360°.

Naturally these figurative representations can only be examples of the invention. The number of bases especially has been reduced to a minimum. The measuring exactitude can be increased at will by increasing this number, but this is naturally combined with a corresponding increase in the number of the receivers used. In the examples named the setting always moves by 30°. If you have two neighbouring bases between which the impression of direction moves, lateral angles of 15° are possible on each side. As the exactitude of estimation for such angles amounts, as shown by experience, to ±2°, an exactitude of setting of 4° would already be possible with this relatively primitive device which would, however, still be increased by the action of difference by the immediate comparison of both right- and left-angles. Generally an exactitude of determination of direction of ±2° can be accepted. By doubling the bases the exactitude can naturally also be doubled. At present this exactitude suffices completely. If a lesser exactitude is required three double employed bases forming an equilateral triangle will suffice.

An increase of the bases naturally also leads to other geometrical figures for the arrangement of the bases in space, as shown in Figs. 3–9. All such devices can, however, be attained by the resolution of the circular surfaces in geometrical figures, as it is explained for 12 bases in Fig. 3 and the following ones and all these figures have the common characteristic that they occupy a much smaller space than the full basis circle.

The advantages of this arrangement according to the invention as compared with what was said in the introduction about the direction methods are the following:

Firstly the measurement is absolutely univocal so that difficult reflections necessary with two rectangular crossed bases or even complicated automatically working devices are quite unnecessary. Furthermore, no apparatus requires to be protected in the free medium and no sound-tube-leads altered in length. Finally, when employing the switching device according to the principle of Figs. 11 and 13–15, the impression is psychologically true to nature, corresponds with reality and is in the correct position when compared with the position of the observer at the apparatus.

What we claim is:—

1. In a system for the binaural detection of the direction of a source of sound, a plurality of sound receivers grouped to form a plurality of bases having such small angular inclinations the one to the other that one of said bases can be chosen which will produce substantially a central binaural image, said bases being arranged to form a plurality of triangles having at least one point common.

2. In a system for the binaural detection of the direction of a source of sound, a plurality of sound receivers grouped to form a plurality of bases having such small angular inclinations the one to the other that one of said bases can be chosen which will produce substantially a central binaural image, said bases being arranged to form two triangles having a common vertex and making in a chosen succession equal angles of inclination with one another.

In testimony whereof we affix our signatures.

HEINRICH HECHT.
HUGO LICHTE.
FRIEDRICH WOLF.